(12) United States Patent
Baum

(10) Patent No.: US 8,677,812 B2
(45) Date of Patent: Mar. 25, 2014

(54) DEVICE FOR MEASURING TIRE PRESSURE HAVING A SYSTEM HOUSING PROVIDED WITH A RESILIENT MEANS

(75) Inventor: Michael Baum, Tiefenbronn-Lehningen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 382 days.

(21) Appl. No.: 13/044,956

(22) Filed: Mar. 10, 2011

(65) Prior Publication Data
US 2011/0219865 A1 Sep. 15, 2011

(30) Foreign Application Priority Data
Mar. 12, 2010 (DE) .......................... 10 2010 012 013

(51) Int. Cl.
*G01M 17/02* (2006.01)
(52) U.S. Cl.
USPC ............................................ 73/146; 340/442
(58) Field of Classification Search
None
See application file for complete search history.

(56) References Cited

U.S. PATENT DOCUMENTS

| | | | |
|---|---|---|---|
| 5,327,116 A * | 7/1994 | Davidson ...................... | 340/443 |
| 5,956,820 A | 9/1999 | Albinski | |
| 6,895,810 B2 * | 5/2005 | Saheki et al. ............... | 73/146.8 |
| 6,922,141 B2 * | 7/2005 | Saheki et al. ................. | 340/447 |
| 6,959,597 B2 | 11/2005 | Ito et al. | |
| 7,040,155 B1 * | 5/2006 | Lundell et al. ............... | 73/146.8 |
| 7,257,998 B2 * | 8/2007 | Luce ............................ | 73/146.8 |
| 7,621,177 B2 * | 11/2009 | Huang et al. ................. | 73/146.8 |
| 8,074,508 B2 * | 12/2011 | Luce ............................ | 73/146.8 |

FOREIGN PATENT DOCUMENTS

| | | |
|---|---|---|
| DE | 196 26 145 A1 | 1/1998 |
| DE | 100 19 082 A1 | 10/2001 |
| DE | 20110759 | 3/2002 |
| DE | 102 36 140 A1 | 2/2004 |
| EP | 1 321 314 A2 | 6/2003 |
| JP | 2007-145 252 A | 6/2007 |

* cited by examiner

*Primary Examiner* — Lisa Caputo
*Assistant Examiner* — Jermaine Jenkins
(74) *Attorney, Agent, or Firm* — RatnerPrestia

(57) ABSTRACT

A device for measuring the tire pressure in a pneumatic tire of a vehicle, having an electronic system housing which has an electronic system for measuring values, acted on by a tire valve, for the tire pressure, wherein the electronic system for measuring values is assigned a receiver arranged outside the pneumatic tire, and wherein the electronic system housing is arranged in the region of the rim well of a rim for the pneumatic tire and is indirectly or directly connected to the tire valve, wherein at least one spring element which is operatively connected to the rim well is provided on the electronic system housing.

11 Claims, 3 Drawing Sheets

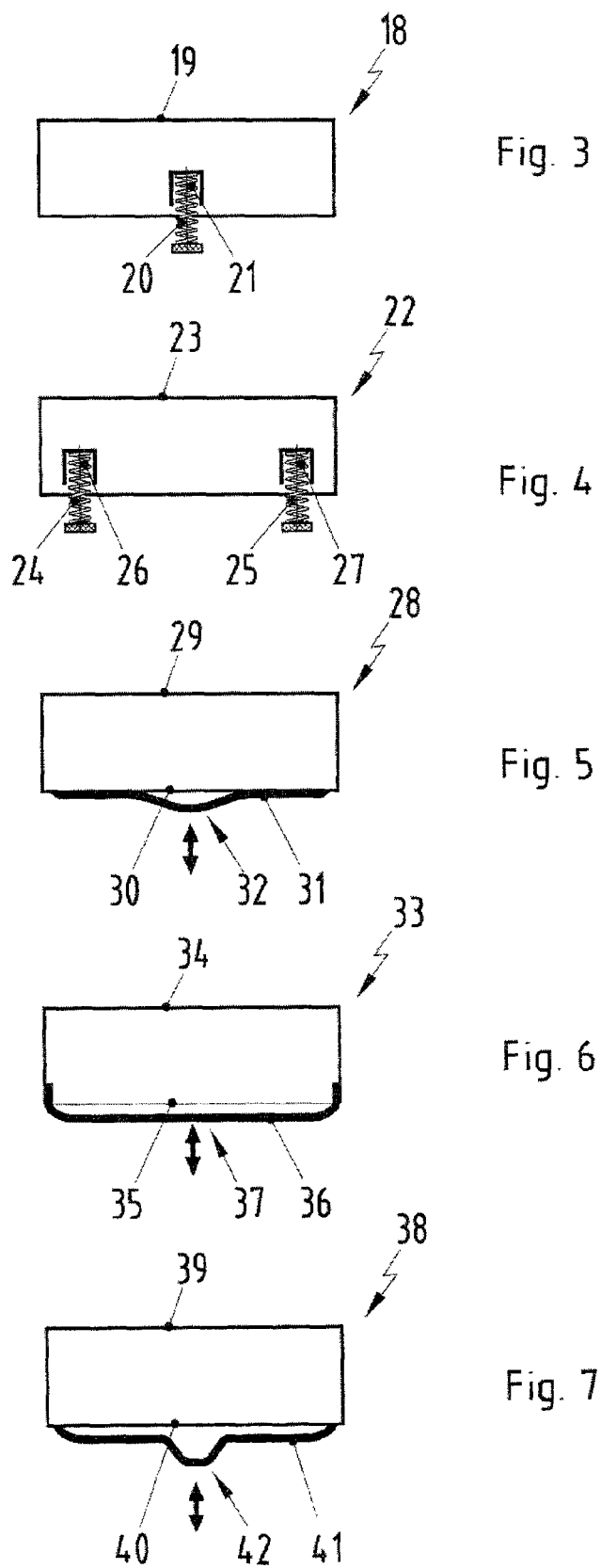

DEVICE FOR MEASURING TIRE PRESSURE HAVING A SYSTEM HOUSING PROVIDED WITH A RESILIENT MEANS

CROSS REFERENCE TO RELATED APPLICATION

This U.S. patent application claims priority to German Patent Application DE 10 2010 012013.8, filed Mar. 12, 2010, which is incorporated by reference herein in its entirety.

FIELD OF THE INVENTION

The invention relates to a device for measuring the tire pressure in a pneumatic tire of a vehicle

BACKGROUND OF THE INVENTION

The tire pressure is decisive for the ability to use a pneumatic tire. It is therefore set according to specifications and has to be regularly checked and, if appropriate, adjusted in order to maintain the functional capability. The tire pressure can also increase during operation as a result of warming. An incorrect tire pressure leads to premature wear or to the pneumatic tire failing. For this reason, tire pressure-monitoring systems are being increasingly used in passenger cars. Tire pressure-monitoring systems serve to monitor the tire pressure in motor vehicles in order to minimize and to detect early accidents caused by incorrect tires. In addition, there can be a saving in petrol with the optimum tire pressure, and unnecessary tire wear can be avoided.

In direct measuring systems, a pressure sensor senses the air pressure and the air temperature of a tire. This information is transmitted, together with an identifier, to a control unit in the vehicle by radio at specific intervals. These systems may detect slow or even rapid pressure losses in all tires since they monitor the pressure directly. Depending on the display concept, the driver is provided with information about the current pressure value in plain text, which he either sees continuously on the display or can interrogate by means of the pressure button, or else he only receives a warning when the tire pressure is too low.

Tire pressure-monitoring systems of the latest generation also have a "left/right rotation detection". This means that any of the four wheel electronic systems located on the vehicle also transmits, in its transmission protocol, the direction of rotation of the tire. The control unit of the tire pressure-monitoring system can therefore assign which of the wheel electronic systems is installed on the right or left of the vehicle. Since this "left/right rotation detection" is measured with acceleration sensors, this technology functions in practice usually only on roads with a smooth or level covering. On roads or paths with an uneven or poor underlying surface covering an incorrect assignment of the corresponding wheel positions or incorrect measurement results may occur owing to excitations/vibrations of the wheel electronic system or the acceleration sensors.

SUMMARY OF THE INVENTION

Taking this as a basis, the present invention relates to the object of providing an improved device with a more reliable method of functioning.

This object is achieved by means of a device that is described hereinafter.

The device is characterized according to aspects of the invention in that at least one spring element which is operatively connected to the rim well is provided on the electronic system housing. This spring element permits the electronic system housing to bear in a secure and constant fashion, preferably under pre-stress, against the rim well, thereby ensuring reliable interrogation and assignment of the measurement results as well as unambiguous right/left detection on all underlying surface coverings. In addition, a correct and unambiguous wheel assignment can be ensured in the pressure displays, and in the combination instrument in the case of possible flat tire messages. The electronic system housing can be connected to the tire valve indirectly by means of accessory components such as adaptors or the like, or directly, for example by means of a corresponding opening/access means on the housing, preferably under prestress. However, it is preferred, but not at all compulsory, for the electronic system housing to have an essentially planar mounting area, pointing toward the rim well, for the spring element which is to be mounted or integrated. In the event of strong vibrations occurring, the spring element therefore serves essentially as a buffer between the electronic system housing and the rim well.

One embodiment provides that the spring element can be arranged on or in the side, assigned to the rim well, of the electronic system housing. This would have the advantage that the spring element could be made relatively short or embodied with a small height. However, it would also be conceivable to arrange the spring element on a lateral housing section of the electronic system housing.

For example, the spring element can be provided with a protective coating in the contact region with the rim well. This protective coating protects, on the one hand, the spring element against severe use or wear (friction, moisture, corrosion or the like) and, on the other hand, protects the rim well against damage by the spring element. The spring element can be partially or completely provided with the protective coating. For example, the protective coating may be made of plastic or rubber.

A further embodiment provides that the spring element can be provided with rubber feet or plastic feet in the contact region with the rim well. The advantages are the same as for the use of a protective coating.

For example, the spring element can be embodied in the manner of a compression spring or torsion spring. For example, in this way it would be possible to use favorable standardized parts which permit the device to be implemented economically.

In addition, it would be conceivable to embody the spring element in the manner of a leaf spring. It is usually composed of a flat piece of sheet metal which is prestressed in an arcuate shape. For example, a plurality of sheets (spring layers) are combined with various lengths and degrees of prestresses from a spring package which is held together by a common bolt or spring clamps.

A further preferred embodiment provides that the spring element can be embodied as a spring clip. The spring clip may have various embodiments here and have, for example, punctiform or planar bearing sections with the rim well.

For example, the spring element can be integrated into a recess in the electronic system housing or into an accessory component which can be connected to the electronic system housing.

For example, the spring element may be composed of metal, lightweight metal, noble metal or a metal alloy. Another embodiment provides that the spring element can be composed of plastic or rubber.

Further advantages, features and details of the invention emerge from the present description in which exemplary embodiments of the invention are described with reference to the drawings. In this context, the features which are mentioned in the claims and in the description may each be essential to the invention individually in themselves or in any desired combination.

BRIEF DESCRIPTION OF THE DRAWINGS

In the drawing:

FIG. 3 is a schematic illustration of a third embodiment of a device;

FIG. 4 is a schematic illustration of a fourth embodiment of a device;

FIG. 5 is a schematic illustration of a fifth embodiment of a device;

FIG. 6 is a schematic illustration of a sixth embodiment of a device; and

FIG. 7 is a schematic illustration of a seventh embodiment of a device.

DETAILED DESCRIPTION OF THE PREFERRED EMBODIMENTS

Figure 1:
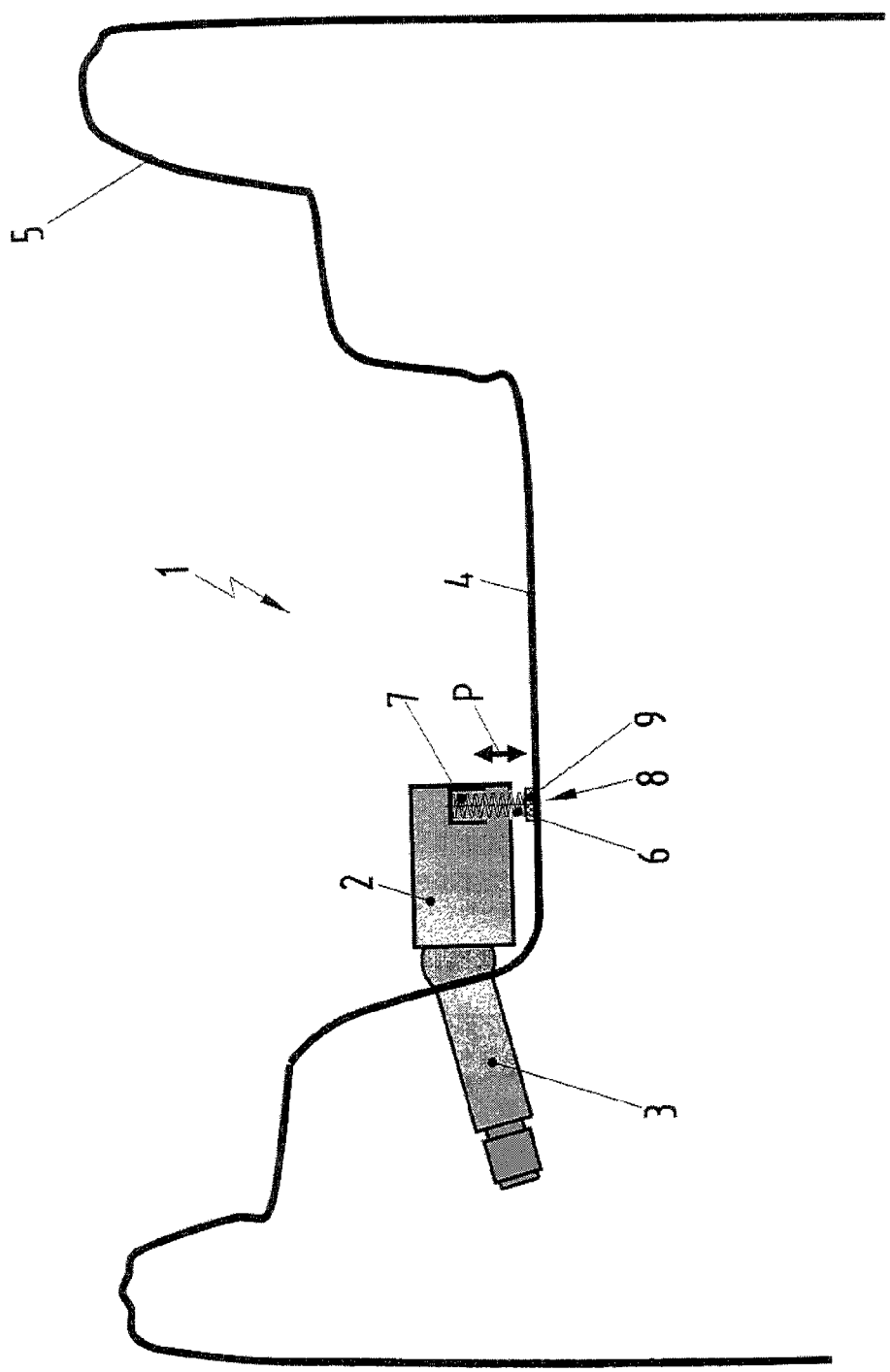
FIG. 1 is a schematic side view of a first embodiment of a device according to aspects of the invention.

FIG. 1 shows a first embodiment of the device 1 for measuring the tire pressure in a pneumatic tire of a vehicle, having an electronic system housing 2 which has an electronic system for measuring values, acted on by a tire valve 3, for the tire pressure, wherein the electronic system for measuring values is assigned a receiver arranged outside the pneumatic tire, and wherein the electronic system housing 2 is arranged in the region of the rim well 4 of a rim 5 for the pneumatic tire and is directly connected to the tire valve 3.

A spring element 6 which is operatively connected to the rim well 4 is arranged in the electronic system housing 2. The spring element 6 is embodied as a compression spring or helical spring and is integrated into a recess 7 in the electronic system housing 2. The spring element 6 is provided with a rubber foot 9 in the contact region 8 with the rim well 4. Via the spring element 6, the electronic system housing 2 can carry out or compensate the movement indicated by the arrow symbol P.

Figure 2:
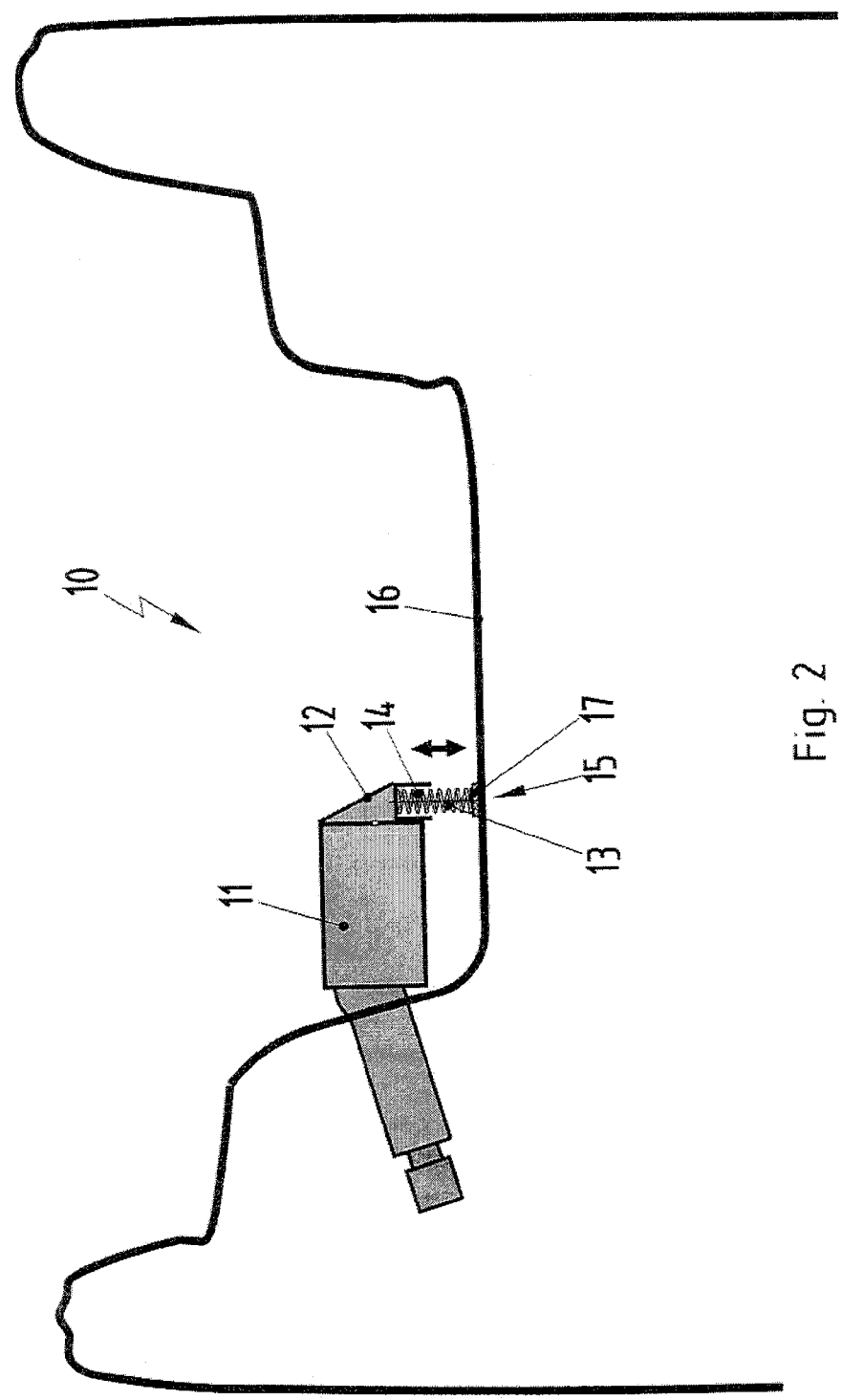
FIG. 2 is a schematic side view of a second embodiment of a device according to aspects of the invention.

FIG. 2 shows a second embodiment of a device 10. The device 10 comprises an electronic system housing 11, wherein an accessory component 12 is arranged on the electronic system housing 11 by arranging a spring element 13.

The spring element 13 is integrated into a recess 14 in the accessory component 12 and has a rubber foot 17 in the contact region 15 with the rim well 16.

FIG. 3 shows a device 18 with a spring element 20 which is arranged centrally in the electronic system housing 19 of the device 18. The spring element 20 is arranged in a recess 21 in the electronic system housing 19. FIG. 4 shows a device 22 with an electronic system housing 23, wherein two spring elements 24, 25 are arranged in the electronic system housing 23, in recesses 26, 27 provided for said spring elements 24, 25.

FIG. 5 shows a device 28, wherein the device 28 comprises an electronic system housing 29. A spring element 31 which is embodied as a spring clip is arranged on the electronic system housing 28, on the side 30, assigned to the rim well, of the electronic system housing 28. The spring element 31 forms, through its design, an essentially punctiform contact region 32 with the rim well and can be provided with a protective coating completely or only in the contact region 32.

FIG. 6 shows a device 33, wherein the device 33 comprises an electronic system housing 34. A spring element 36 which is embodied as a spring clip is arranged on the electronic system housing 34, on the side 35, assigned to the rim well, of the electronic system housing 34. The spring element 36 forms, through its design, an essentially planar contact region 37 with the rim well and can be provided with a protective coating completely or only in the contact region 37.

FIG. 7 shows a device 38, wherein the device 38 comprises an electronic system housing 39. A spring element 41 which is embodied as a spring clip is arranged on the electronic system housing 39, on the side 40, assigned to the rim well, of the electronic system housing 39. The spring element 41 forms, through its design, an essentially planar contact region 42 with the rim well, wherein the planar contact region 42 is smaller than the contact region shown in FIG. 6.

Through the various configurations of the spring elements it is possible to influence the bearing forces or spring properties of the device.

The invention claimed is:

1. A device for measuring a tire pressure in a pneumatic tire of a vehicle, said device comprising:
    an electronic system housing having an electronic system for measuring values for the tire pressure, wherein the electronic system is acted on by a tire valve, wherein the electronic system for measuring values is assigned a receiver arranged outside the pneumatic tire, and wherein the electronic system housing is arranged in a region of a rim well of a rim for the pneumatic tire and is connected to a tire valve; and
    at least one spring element, which is operatively connected to the rim well, is provided on the electronic system housing, wherein the spring element includes rubber feet or plastic feet in a contact region of the spring element that contacts the rim well.

2. The device as claimed in claim 1, wherein the spring element is arranged on or in a side of the electronic system housing that is assigned to the rim well.

3. The device as claimed in claim 1, wherein the spring element includes a protective coating in a contact region of the spring element that contacts the rim well.

4. The device as claimed in claim 3, wherein the protective coating is made of plastic or rubber.

5. The device as claimed in claim 1, wherein the spring element is either a compression spring or a torsion spring.

6. The device as claimed in claim 1, wherein the spring element is a leaf spring.

7. The device as claimed in claim 1, wherein the spring element is a spring clip.

8. The device as claimed in claim 1, wherein the spring element is integrated into a recess in the electronic system housing.

9. The device as claimed in claim 1, wherein the spring element is integrated into an accessory component which is configured to be connected to the electronic system housing.

10. The device as claimed in claim 1, wherein the spring element is composed of metal, lightweight metal, noble metal or a metal alloy.

11. The device as claimed in claim 1, wherein the spring element is composed of plastic or rubber.

* * * * *